United States Patent [19]

Turner

[11] Patent Number: 5,739,825
[45] Date of Patent: Apr. 14, 1998

[54] COMPUTER GENERATED HATCH FILLING WITHIN A VECTOR GRAPHIC

[75] Inventor: John B. Turner, Mountain View, Calif.

[73] Assignee: Apple Computer, Inc., Cupertino, Calif.

[21] Appl. No.: 537,635

[22] Filed: Oct. 2, 1995

[51] Int. Cl.$^6$ .................................................. G06T 11/40
[52] U.S. Cl. ........................ 345/441; 345/429; 345/467
[58] Field of Search .................................... 345/429, 441, 345/442, 443, 470, 467

[56] References Cited

U.S. PATENT DOCUMENTS

| | | | |
|---|---|---|---|
| 5,386,510 | 1/1995 | Jacobs | 395/505 |
| 5,500,924 | 3/1996 | DeSilva et al. | 395/129 |
| 5,619,633 | 4/1997 | Turner | 395/141 |

OTHER PUBLICATIONS

Macromedia Freehand User Manual, Version 5.0, Chapter 4, 1994.

Real World Freehand, Olav Martin Kvern, 1991, pp. 115–122.

Kvern, Olav Martin. "Real World FreeHand 3," PeachPit Press, Inc., Berkeley, 1991, entire article, pp. 400–401, 421.

*Primary Examiner*—Almis H. Jankus
*Assistant Examiner*—Sabrina Dickens
*Attorney, Agent, or Firm*—Carr & Ferrell LLP

[57] ABSTRACT

In a computer system, a method and an apparatus for generating hatch fills within a contour of a vector graphic. The method of the present invention includes the steps of reading vector graphic data defining a contour of a vector graphic, creating a series of intersection lines overlaying the vector graphic, defining intersection points that indicate where the intersection lines intersect the contour of the vector graphic, and wherein the intersection points create an array having a row corresponding to each intersection line, connecting with connection lines the intersection points of each row, and verifying that each of the connection lines are contained within the contour of the vector graphic, and removing portions of any connection lines not contained within the contour of the vector graphic.

23 Claims, 8 Drawing Sheets

Hatch Fill Control Variables Memory

COMPUTER GENERATED HATCH FILLING WITHIN A VECTOR GRAPHIC

BACKGROUND OF THE INVENTION

1. Field of the Invention

The present invention relates generally to graphics generated on a computer. More particularly, the present invention relates to modification of existing computer line graphics. Specifically, the present invention relates to an apparatus and method for modifying computer generated vector graphics to have a more humanistic appearance by shading or hatch filling within the contour of a vector graphic or vector shape.

2. Description of the Background Art

Computer graphics can be divided into two broad categories, raster and vector. These categories differ primarily in the manner that drawing data is created, stored, and edited. Raster graphics, often called bitmaps, are two dimensional arrays of picture elements. Similar to grains in a photograph, each picture element (pixel) has a color value. The collection of these pixels and their corresponding values form a raster image.

In contrast, vector graphics are based on a definition of geometric shapes. Shapes are defined by precise mathematically defined Cartesian points. Thus, the shapes may be lines, rectangles, curves, or any arbitrary polygon defined by mathematical points. The collection of these geometric shapes and their mathematical definitions form a computer vector graphic or drawing.

Shapes in a vector drawing are divided up into strokes and fills. Strokes indicate that a vector shape should be drawn with a constant width of pixels of some color value. Fills indicate that the boundary of a shape should be closed and the interior filled with pixels of some color value. Strokes and fills that share the same shape differ in the method by which a shape is rendered.

A long-standing goal in computer graphics has been to enable computer users to produce output that does not look computer generated. The very strength of computer graphics, that is, the exact definition of an image or drawing, has been a liability because humans do not draw with such perfection. Consequently, most graphics generated on a computer look artificial.

When using raster graphics, the problem of the artificial appearance of drawings can be corrected somewhat by using digital filters. The color value of each pixel within a raster image is modified algorithmically by a digital filter. The filtering algorithms, originally based on photographic image processing, can get very complex and can provide interesting "painting" effects. Raster digital filters can modify raster images and create such appearances as watercolor or oil painting.

Unfortunately, the effects available to raster graphics do not apply to vector graphics. The analogy again is the difference between photographs and mathematical graphs. A computer user working with the desirable preciseness of vector graphics must forfeit the pleasure of automatically producing a vector that could appear hand drawn.

Therefore, there is a strong desire for a system that would enable a computer draftsman to benefit from the preciseness offered by vector graphics, but also be able to simply and easily produce more humanistic appearing drawings.

SUMMARY OF THE INVENTION

The present invention provides a method and apparatus for hatch filling within the contour of a vector graphic to provide a more humanistic appearance. The method of the present invention includes the steps of reading vector graphic data defining a contour of a vector graphic, creating a series of intersection lines overlaying the vector graphic, and defining intersection points that indicate where the intersection lines intersect the contour of the vector graphic. The intersection points create an array having a row corresponding to each intersection line. The method further includes the steps of connecting with connection lines the intersection points of each row, verifying that each of the connection lines are contained within the contour of the vector graphic, and removing portions of any connection lines that are not contained within the contour of the vector graphic.

The apparatus of the present invention includes a processor, an operating system memory coupled to the processor, a vector graphic database memory coupled to the processor for storing data that defines the vector graphic, a hatch fill routines memory coupled to the processor for controlling the operating system memory and the processor, and a control variables memory coupled to the processor for storing control variables that direct the hatch fill routines memory.

DETAILED DESCRIPTION OF THE PREFERRED EMBODIMENTS

The present invention provides a method and apparatus for hatch filling or shading a computer generated vector graphic or shape. Data points of a vector shape are received by the apparatus of the present invention, and the invention then modifies the original vector shape to produce a vector shape having a hatch fill. The method of the present invention includes control variables that determine how various aspects of the vector shape are to be modified.

Figure 1A:
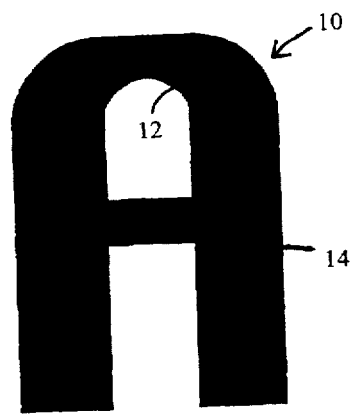
FIG. 1A illustrates a vector shape before being modified by the present invention.

Referring now to FIGS. 1A–1K, an overview of the various intermittent steps for modifying a vector shape in accordance with the hatch fill method of the present invention is shown. Referring first to FIG. 1A, an example of a vector fill shape 10, a graphic representation of the letter "A", that contains two contours 12 and 14 is illustrated. A contour is defined as separate, continuous, collection of geometric points. Several contours may be combined to define a vector shape. With reference to vector shape 10, contour 12 defines an interior contour and contour 14 defines an exterior contour. Contours 12 and 14 combine to form the original black filled vector shape 10.

Figure 1B:
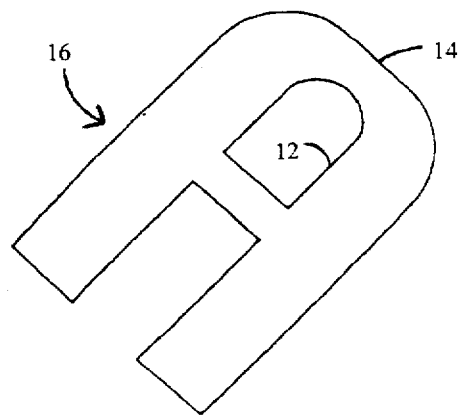
FIG. 1B illustrates the intermittent step of rotating the vector shape in FIG. 1A in accordance with the present invention.

Referring to FIG. 1B, vector shape 16 is illustrated after vector shape 10 is rotated about its center to an angle determined by a hatch angle control variable. Vector shape 16 is vector shape 10 with the original black fill removed and replaced with a clear background. The angle of rotation determines the angle of the hatch fills to be generated. In the example illustrated in FIG. 1B, the hatch angle control variable is set to a value of +45°.

Figure 1C:
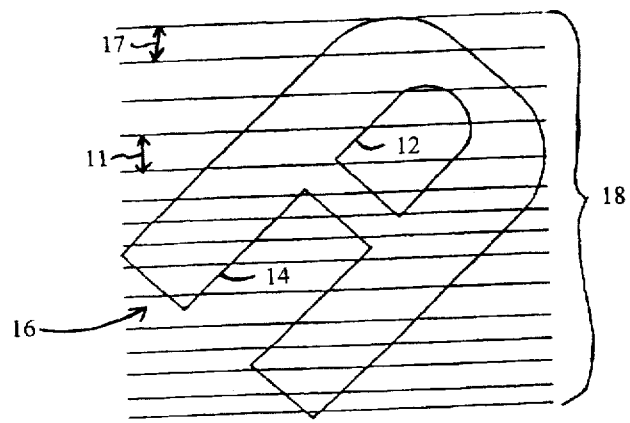
FIG. 1C illustrates the intermittent step of overlaying the vector shape in FIG. 1B with a series of intersection lines in accordance with the present invention.

Referring to FIG. 1C, a series of parallel and horizontal intersection lines 18 generated upon the rotated vector shape 16 is illustrated. The horizontal intersection lines 18 are generated to intersect the vector shape 16 and create intersection points. In other embodiments, the intersection lines 18 may not be substantially horizontal. Furthermore, the intersection lines 18 also may not be substantially parallel.

In the preferred embodiment, the intersection lines 18 are horizontal and spaced apart in accordance with a hatch frequency control variable. The hatch frequency control variable is adjusted by a hatch frequency variance control variable that introduces random variations in a gap 17 between horizontal intersection lines 18. The hatch frequency variance control variable determines the amount of variance from the hatch frequency control variable. For example, if the hatch frequency control variable is set to 10 pixel widths, and the hatch fill variance control variable is set to 2, then the size of the gaps 17 varies randomly between 8 and 12 pixel widths.

Figure 1D:
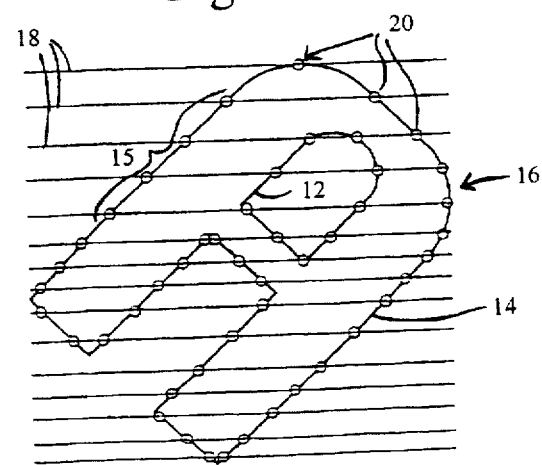
FIG. 1D illustrates the intermittent step of defining intersection points on the contour of the vector shape in FIG. 1C in accordance with the present invention.

Referring to FIG. 1D, a two dimensional array 15 of intersection points 20 is illustrated. The array 15 is generated by intersecting the rotated vector shape 16 with the horizontal intersection lines 18. The intersection points 20 are generated on both vector shape contours 12 and 14.

Figure 1E:
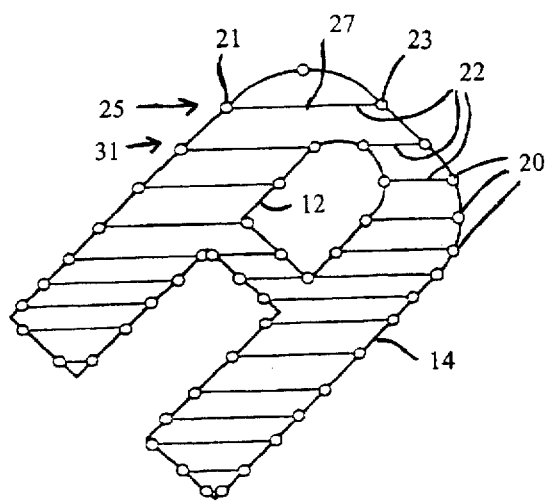
FIG. 1E illustrates the intermittent step of connecting with connection lines the intersection points of each row of the vector shape in FIG. 1D in accordance with the present invention.

Referring to FIG. 1E, connection lines 22 are illustrated between each of the intersection points 20. The connection lines 22 are portions of the intersections lines 18 that are contained within the interior of the vector shape 16, as determined by the interior contour 12 and the exterior contour 14. The connection lines 22 are generated by the system in accordance with the present invention.

Figure 1F:
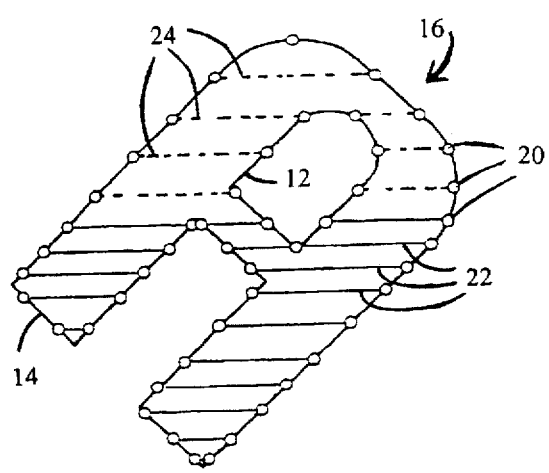
FIG. 1F illustrates the intermittent step of beginning to dash the connection lines of the vector shape in FIG. 1E in accordance with the present invention.

Referring to FIG. 1F, the connection lines 22 are converted to dashed lines 24. Characteristics of the dashed lines 24, such as the length of the dashes and the length of the gaps between the dashes, are determined by a dashing characteristics control variable.

Figure 1G:
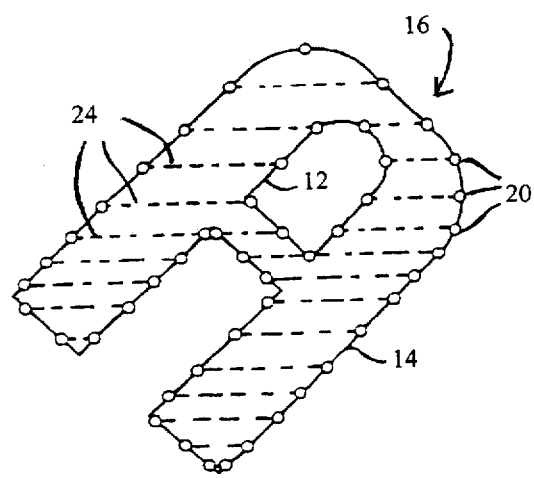
FIG. 1G illustrates the intermittent step of dashing the connection lines of the vector shape in FIG. 1E in accordance with the present invention.

Referring to FIG. 1G, illustrated are all of the connection lines 22 after being converted into dashed lines 24 in accordance with the present invention.

Figure 1H:
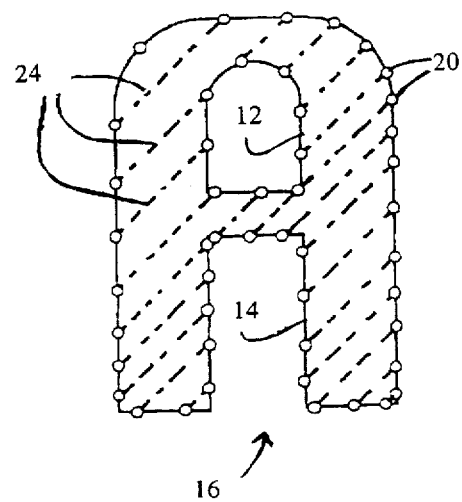
FIG. 1H illustrates the intermittent step rotating the vector shape back to its original position in accordance with the present invention.

Referring to FIG. 1H, illustrated is the vector shape 16 after being rotated back to its original position. The dashed lines 24 also have been rotated with the vector shape 16. In the illustrated embodiment, the vector shape 16 was rotated back a −45°. The angle of forward and reverse rotation is controlled by a positive and a negative rotation of the hatch angle control variable.

Figure 1I:
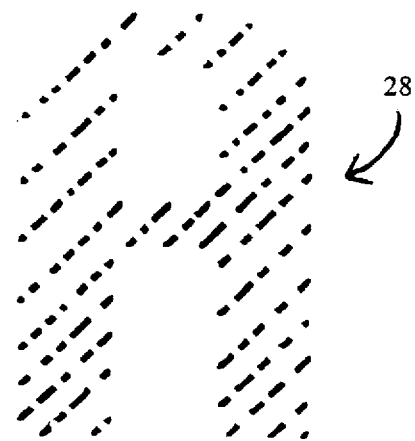
FIG. 1I illustrates a final resulting vector shape following the sequence illustrated in FIGS. 1A–1H of the present invention.

Referring to FIG. 1I, illustrated is a hatch filled vector shape 28 generated by the present invention. As illustrated, the interior contour 12 and the exterior contour 14 are removed in the final, preferred embodiment.

Figure 1J:
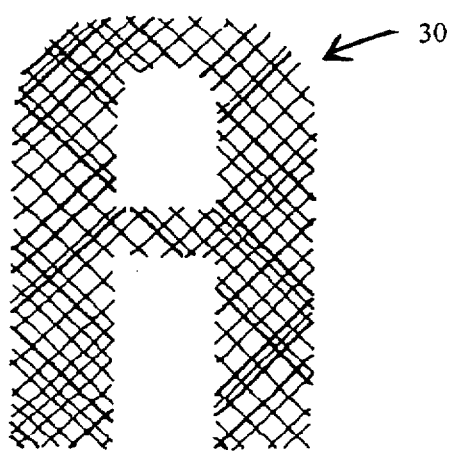
FIG. 1J illustrates an example of another resulting variation upon the original vector shape in FIG. 1A by generating multiple connection lines within the vector shape.

Referring to FIG. 1J, illustrated is a vector shape 30 generated by the present invention applying multiple hatch fill generations with a variance of hatch angles. Multiple generations of the connection lines 22 are controlled by the repetition applications control variable and the repetition applications variance control variable.

Figure 1K:
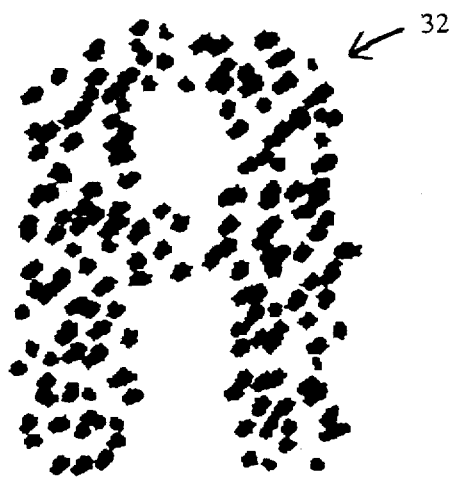
FIG. 1K illustrates a further resulting modification of the vector shape 1A generated using a larger pen width and a randomizing drawing routines.

Referring to FIG. 1K, illustrated is a vector shape 32 generated using the hatch fill method of the present invention in combination with larger pen width and randomizing drawing routines. As can be seen from vector shape 32, the present invention has produced a vector shape 32 that appears to be hand drawn.

Figure 2:
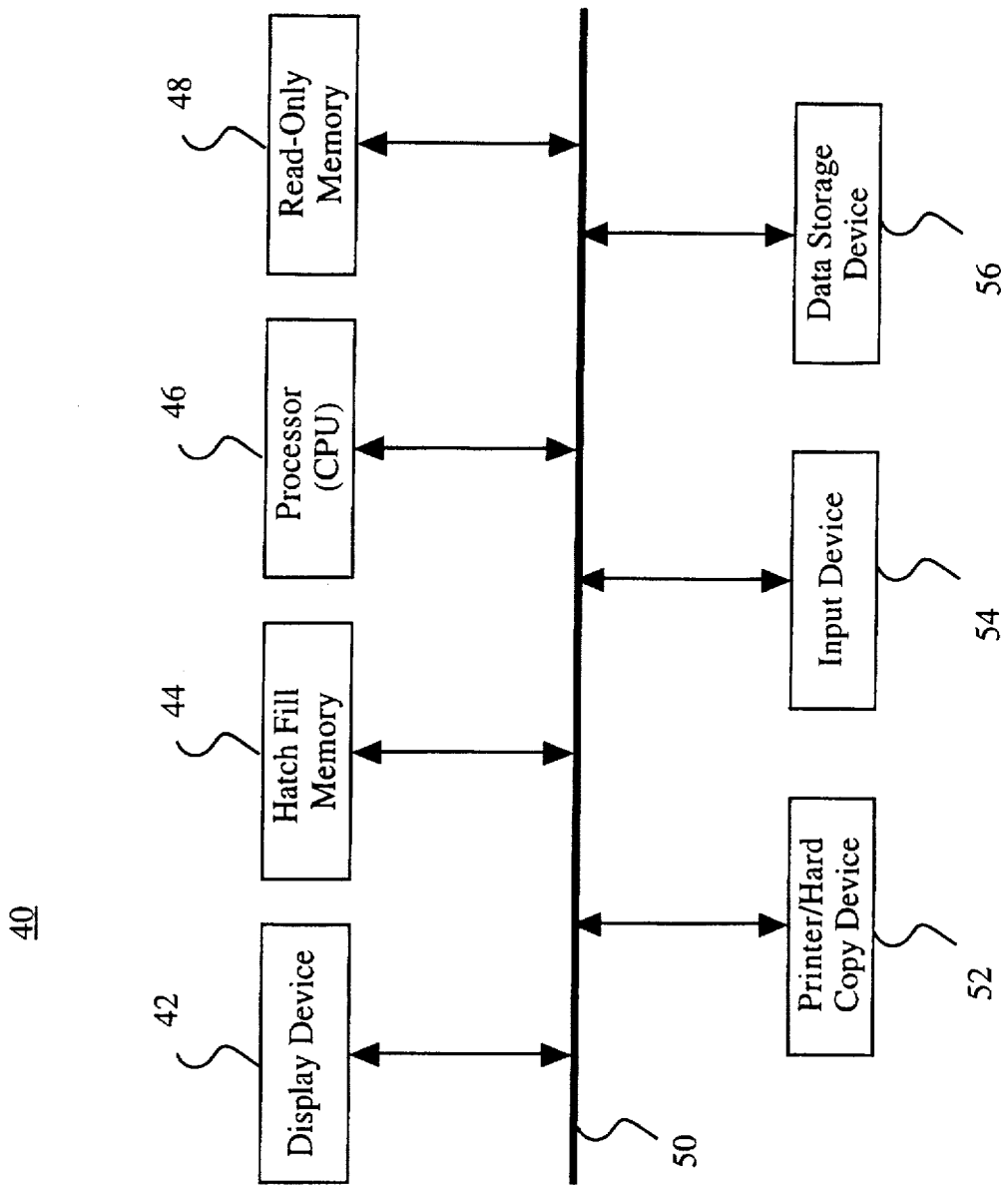
FIG. 2 is a block diagram of a computer system incorporating a preferred embodiment of the present invention.

Referring now to FIG. 2, a block diagram is illustrated of a preferred embodiment of a graphics generation and manipulation system 40 constructed in accordance with the present invention and capable of implementing the preferred method of the present invention. The graphics generation and manipulation system 40 includes a display device 42, a hatch fill memory 44, a central processing unit (CPU) 46, a read-only memory (ROM) 48, a printer/hard copy device 52, an input device 54, and a data storage device 56. The central processing unit (CPU) 46, display device 42, input device 54, hatch fill memory 44, and read-only memory (ROM) 48 are coupled together via a common bus 50, such as in a personal computer.

The CPU 46 is preferably a microprocessor such as a Motorola 68040, IBM PowerPC 601, Intel 80486, or Intel Pentium®. The display device 42 is preferably a video monitor, and the input device 54 is preferably a keyboard and/or mouse type controller. The CPU 46 also is coupled to the printer/hard copy device 52, such as a laser printer, in a conventional manner. The data storage device 56 preferably is a disk drive.

The system 40 can be implemented on various computer systems, including Apple Macintosh® and IBM PC type computers. The CPU 46, under the guidance of instructions received from the hatch fill memory 44, ROM 48, and from the user through the input device 54, provides signals to be displayed on the display device 42.

Figure 3:
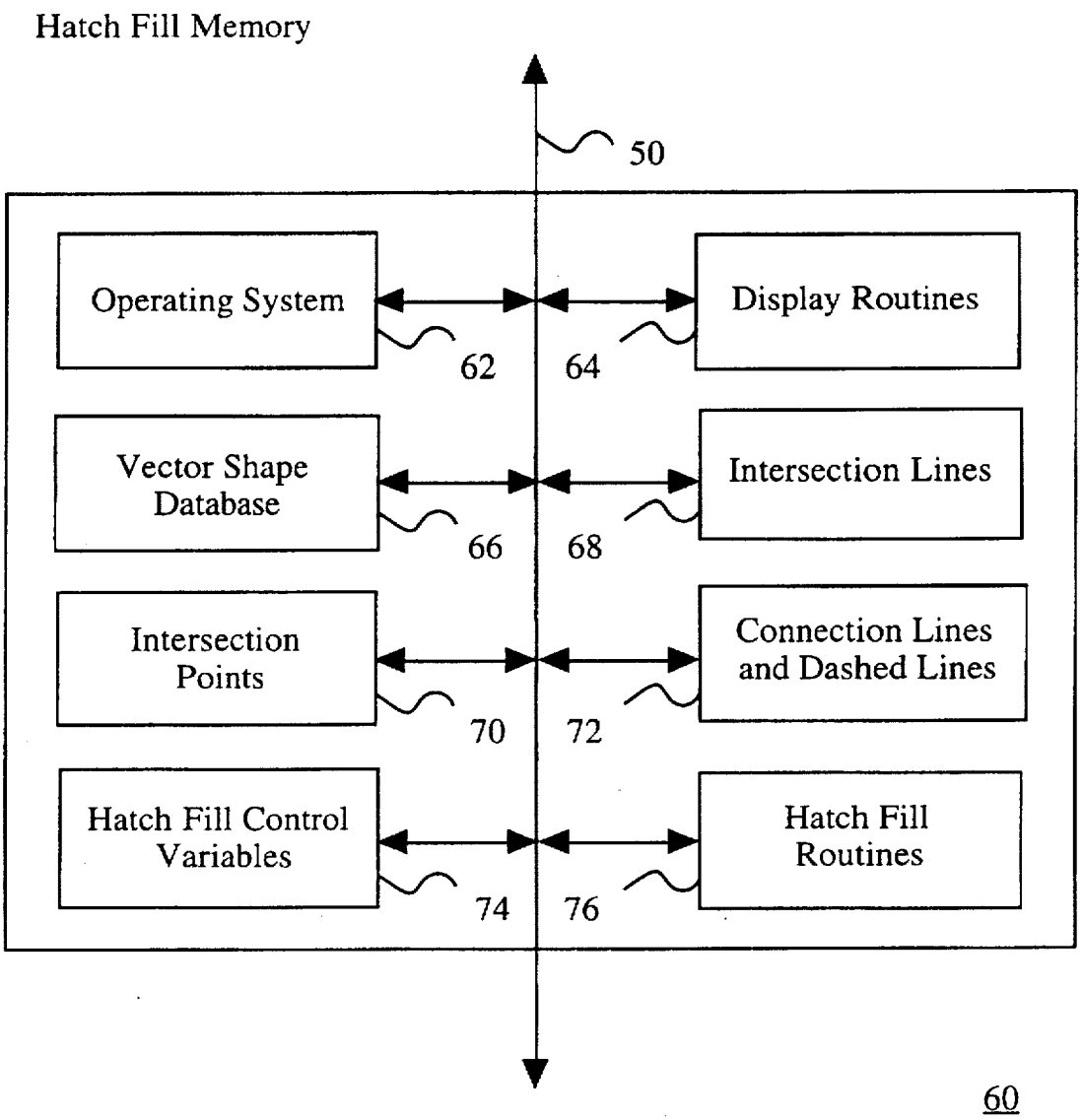
FIG. 3 is a block diagram of the hatch fill memory in FIG. 2.

Referring now to FIG. 3, a preferred embodiment of the hatch fill memory 60, which is preferably a random access memory (RAM) is illustrated having sub-memories for a conventional operating system 62, conventional graphics display routines 64, and a conventional vector shape database 66. The sub-memory for graphics display routines 64 stores a conventional routine for displaying vector shape data on the display device 42. The sub-memory for vector shape database 66 stores vector shape points and associated data for all of the shapes to be modified.

In accordance with the present invention, the hatch fill memory 60 further includes a sub-memory 68 for storing intersection lines 18, a sub-memory 70 for storing intersection points 20, and a sub-memory 72 for storing connection lines 22 and dashed lines 24. The hatch fill memory 60 further includes a sub-memory 74 for storing hatch fill control variables and a sub-memory 76 for storing hatch fill routines. The sub-memory 76 for storing hatch fill routines contains the computer instructions necessary for modifying a vector shape in the manner designated by variables contained within the hatch fill control variables sub-memory 74 of the present invention. The hatch fill control variables sub-memory 74 is illustrated in detail in FIG. 4. All the sub-memories 62, 64, 66, 68, 70, 72, 74 and 76 are coupled to the communication bus 50 of the computer system 40.

Figure 4:
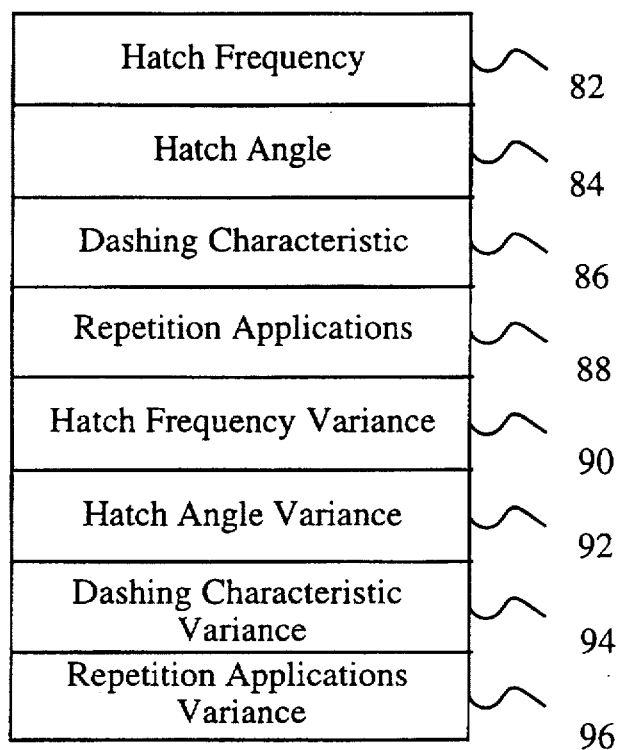
FIG. 4 is a block diagram of memory allocations in the hatch fill control variables memory in FIG. 3.

Referring now to FIG. 4, a block diagram 80 of the hatch fill control variables memory 74 is illustrated. The hatch fill control variables memory 80 includes memory allocation for hatch frequency 82, hatch angle 84, dashing characteristics 86, repetition applications 88, hatch frequency variance 90, hatch angle variance 92, dashing characteristics variance 94, and repetition applications variance 96. The hatch frequency memory allocation 82 stores the frequency of intervals or gaps 17 between the horizontal intersection lines 18 (FIG. 1C) that intersect the contours 12 and 14 of the vector shape 16. A smaller number indicates a smaller gap 17 between each horizontal intersection line 18. A larger number stored in the hatch frequency memory allocation 82 indicates a wider gap 17. As discussed above, the hatch frequency variance memory allocation 90 stores a control variable indicating the statistical variance of the size of the gaps 17 between each of the horizontal intersection lines 18. The less uniform the size of the gaps 17 are between the horizontal intersecting lines 18, the more humanistic the appearance of the final generated vector shape 28.

The hatch angle memory allocation 84 stores a variable that determines the angle of rotation of the vector shape 16 about an axis of rotation. The hatch angle variance memory allocation 92 stores a variable that determines the range of random variance permitted from the angle value stored in the hatch angle memory allocation 84. The repetition applications memory allocation 88 stores a number that determines the number of times a complete hatch fill generation sequence is applied to an original vector shape. The repetition applications variance memory allocation 96 determines an amount the value stored in the repetition applications memory allocation 88 is varied. The dashing characteristics memory allocation 86 controls the length of gaps between dashes and the length of the dashes in the dashed lines 24. The dashing characteristics variance memory allocation 94 stores a value that determines a range within which the value stored in the dashing characteristics memory allocation 86 is varied.

Figure 5A:
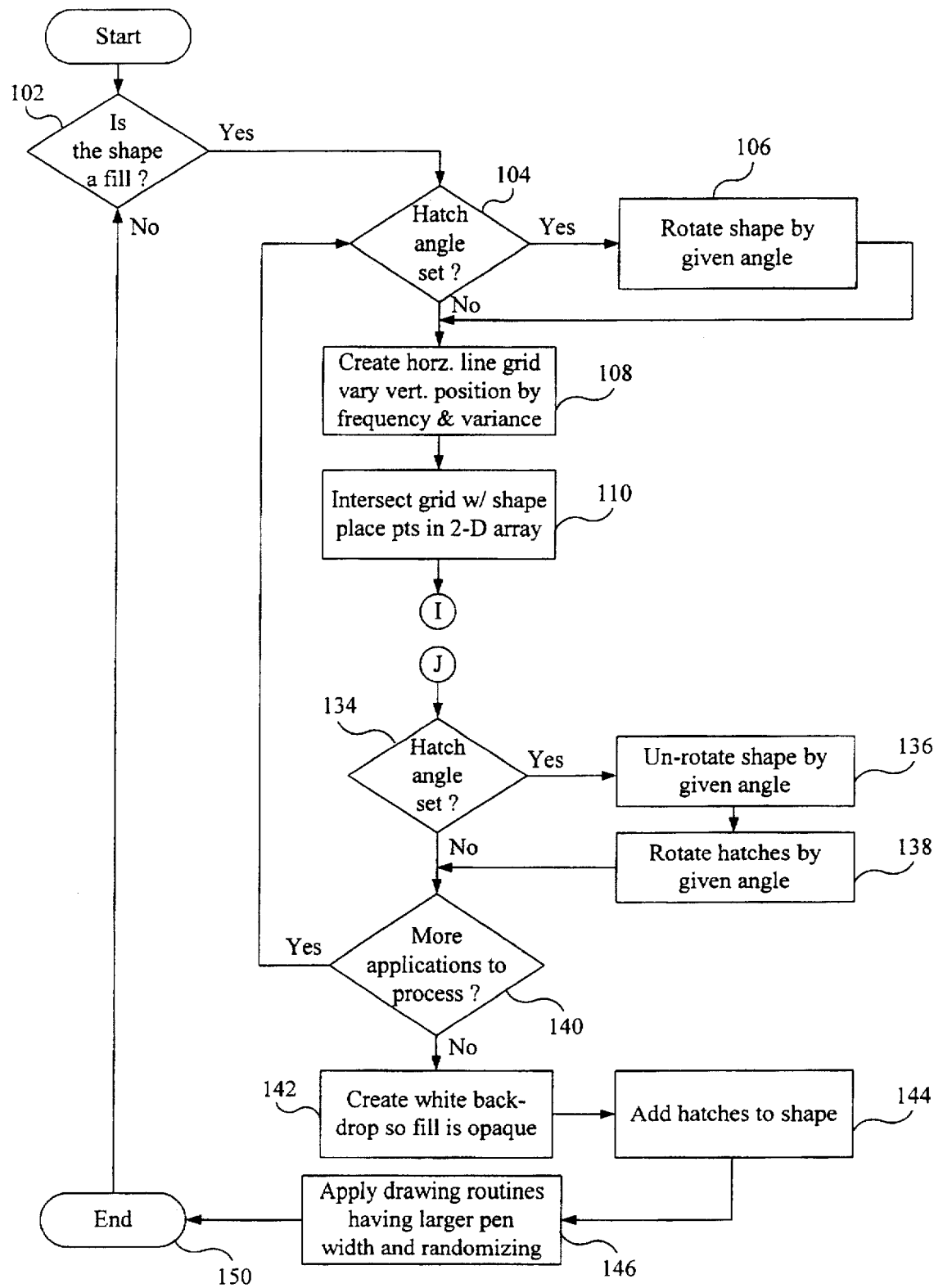
FIGS. 5A and 5B are a flowchart of the preferred hatch filling method according to the present invention.
Figure 5B:
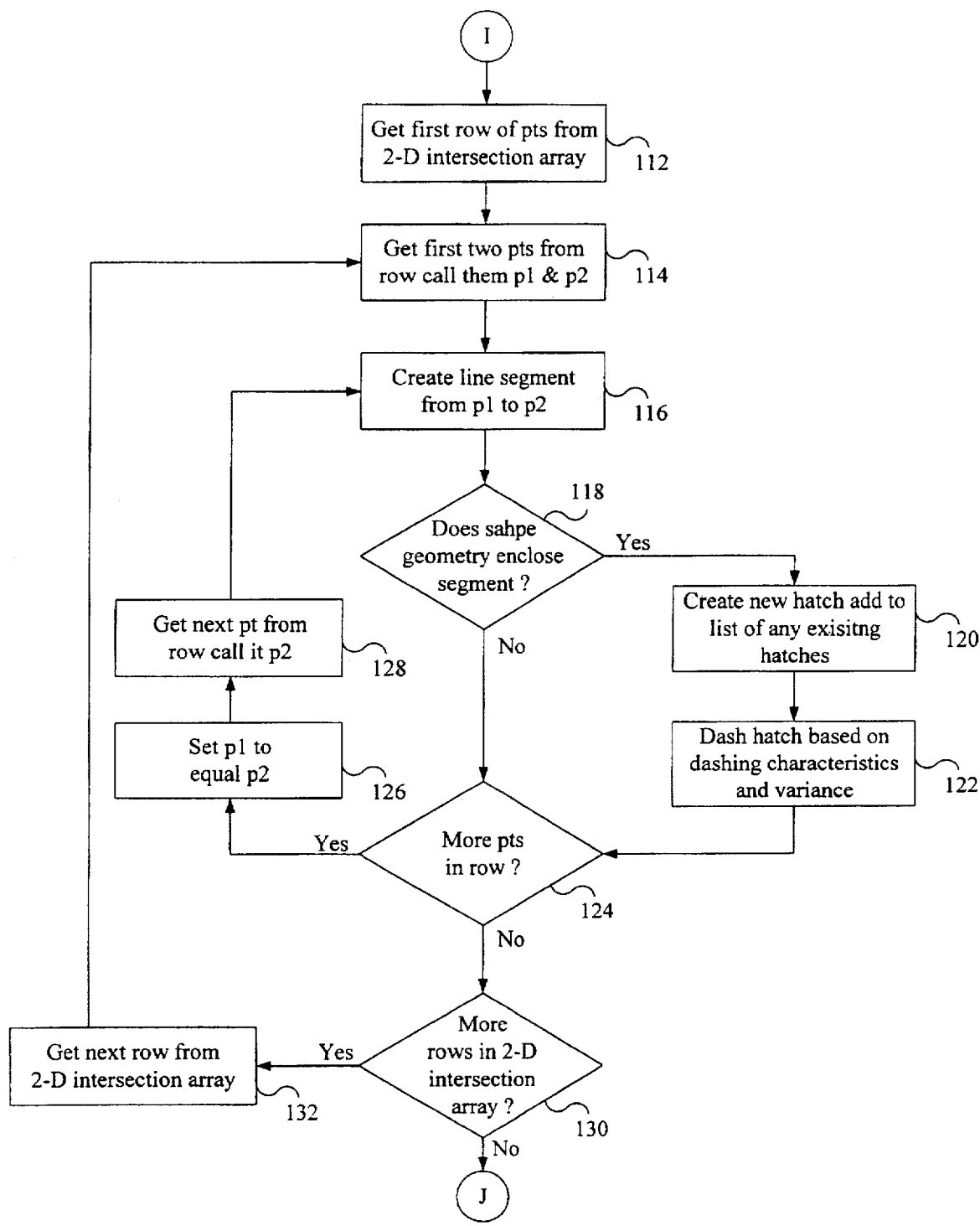

Referring now to FIGS. 5A and 5B, illustrated is a flowchart of a preferred method for modifying a vector shape with a hatch fill style according to the present invention. Beginning at step 102, the computer system 40 first checks to verify that the vector shape is a fill and not a stroke. Since the hatch fill style applies only to fills in vector shapes, stroke shapes are ignored and bypassed. If a vector shape is a fill, the system 40 proceeds to step 104 and reads the hatch angle memory allocation 84 to determine the angle the vector shape 10 is to be rotated (see FIG. 1B). If there is a hatch angle stored, then the system 40 proceeds to step 106 where the entire vector shape 10 is rotated according to the angle stored in the hatch angle memory allocation 84. Regardless of whether the hatch angle is set, the system 40 continues to step 108 to generate a series of horizontal intersection lines 18 overlaying the vector shape 16 (see FIG. 1C). (In other embodiments the intersection lines 18 can be drawn at an angle, instead of rotating the vector shape 10.)

The distance 17 between each of the intersection lines 18 is determined by the value stored in the hatch frequency memory allocation 82, statistically varied accordingly to a value stored in and the hatch frequency variance memory allocation 90. At step 110 the system 40 generates intersection points 20 where the contours 12 and 14 of the vector shape 16 intersect the intersection lines 18. The resulting intersection points 20 create an array of intersection points having a series of horizontal rows corresponding to each of the intersection lines 18 (see FIG. 1D).

Referring to FIG. 5B, the system 40 continues to step 112 where the first row 25 of intersections points 20 are retrieved from the intersection points sub-memory 70. At step 114 the first row 25, having two intersection points 20 from the current row 25, are examined and named for reference as p1 and p2, which are intersection points 21 and 23, respectively. At step 116 the two intersection points 21 and 23 (p1 and p2) define a line segment 27 starting at intersection point 21 (p1) and continuing to intersection point 23 (p2).

Next, at step 118 the vector shape 16 is examined by the system 40 to determine if the line segment 27 (p1–p2) is enclosed completely within the contours 12,14 of the vector shape 16. If the line segment 27 is within the contours 12,14 of the vector shape 16, then the system 40 stores the line segment 27 as a connection line 22 which is stored in connection line sub-memory 72 (see FIG. 1E). Next, in steps 120 and 122, the line segment 27, which is p1–p2, is converted to a dashed line 24 having lengths and spaces determined by values stored in the dashing characteristics memory allocation 86, statistically varied and according to a value stored in the dashing characteristic variance memory allocation 94.

The system 40 proceeds to step 124 to verify if there are any more intersection points 20 in that row. If so, then in step 126 the system 40 defines p1 equal to p2. Then, at step 128 the system 40 defines the next intersection point 20 from the row and defines it as p2. For example, row 31 as illustrated in FIG. 1E is a row that has four intersection points 20. The system 40 then returns back to step 116.

If there are no more intersection points 20 within an intersection line row, such as row 25, then at step 130 the system 40 looks for a new intersection line row following the recently examined intersection line row. If there is another intersection line row beneath the previously examined intersection line row, then at step 132 the system 40 reads the next row of intersection points 20 from the intersections lines sub-memory 68 and loops back to step 114. If there is not another intersection line row following the previously examined intersection line row, then the system 40 proceeds to step 134 in FIG. 5A.

At step 134 the system verifies if the hatch angle memory allocation 84 has a value, and then at step 136 the vector shape 16 is un-rotated from the position it was rotated to in step 106 (see FIG. 1H). Next at step 138 the system 40 rotates the list of hatches or dashed lines 24 that have been generated. The process of rotating the vector shape 16, generating the dashed lines 24, un-rotating the vector shape 16, and rotating the dashed lines allows the hatch filling method to utilize horizontal lines which are easy to intersect and process.

The system 40 then moves to step 140 where the repetition applications memory allocation 88 is queried to indicate whether another list of hatches should be added to the current list stored in the connection lines and dashed lines sub-memory 72; that is, whether another set of hatch fills should be generated by the system 40. If more than one application is indicated by the repetitions applications memory allocation 88, the system 40 returns to step 104. If no more applications are indicated by the multiple applications memory allocation 88, then at step 142 a fill shape color is turned to white to provide a backdrop for the hatches or dashed lines 24. At step 144 the hatches or dashed lines 24 are added to the vector shape definition and stored in the vector shape database sub-memory 66.

A vector shape can be a collection of shapes and this collection of shapes is what results from the hatch fill method of the present invention. Finally, in step 146, a different stoke or pen width is utilized to draw the generated hatch fills, thus giving the hatch fills an additional aspect to enable the resulting vector shape 32 to have the appearance of being hand drawn. The method then terminates at step 150.

While the invention has been described in connection with a preferred embodiment, there is no intent to limit the invention to that embodiment. On the contrary, the intent is to cover all alternatives, modifications and equivalents included within the spirit and scope of the invention as defined by the appended claims.

I claim as my invention:

1. In a computer system having a display device, a method for hatch filling a vector graphic, the method comprising the steps of:

reading vector graphic data defining a contour of a vector graphic;

creating a series of intersection lines overlaying the vector graphic;

defining intersection points that indicate where the intersection lines intersect the contour of the vector graphic, and wherein the intersection points create an array having a row corresponding to each intersection line;

connecting with a connection line the intersection points of each row; and verifying that each of the connection lines are contained within the contour of the vector graphic, and removing portions of any connection lines not contained within the contour of the vector graphic.

2. The method of claim 1, wherein the intersection lines are parallel.

3. The method of claim 1, wherein the intersection lines are unparallel.

4. The method of claim 1, wherein the intersection lines are horizontal.

5. The method of claim 1, wherein the intersection lines are unhorizontal.

6. The method of claim 1, further comprising the step of:

rotating the contour of the vector graphic by a predetermined angle.

7. The method of claim 1, wherein the intersection lines are drawn at a predetermined angle.

8. The method of claim 6, further comprising the step of:

rotating the contour of the vector graphic back to its original position.

9. The method of claim 8, further comprising the step of:

rotating the connection lines together with the contour of the vector shape.

10. The method of claim 1, wherein the distance between each of the intersection lines is inconsistent.

11. The method of claim 1, further comprising the step of:

dashing each of the connection lines between the intersection.

12. In a computer system having a display device, a method for hatch filling a vector graphic, comprising the steps of:

reading vector graphic data defining a contour of a vector graphic;

creating a series of intersection lines overlaying the vector graphic;

defining intersection points that indicate where the intersection lines intersect the contour of the vector graphic, the intersection points creating an array having a row corresponding to each intersection line;

connecting with a connection line the intersection points of each row;

verifying that each of the connection lines are contained within the contour of the vector graphic, and removing portions of any connection lines not contained within the contour of the vector graphic, and dashing each of the connection lines between the intersection points, wherein the frequency of dashes in the dashed lines is controlled by a dashing characteristics control variable.

13. In a computer system having a display device, a method for hatch filling a vector graphic, comprising the steps of:

reading vector graphic data defining a contour a vector graphic;

creating a series of intersection lines at a predetermined angle overlaying the vector graphic;

defining intersection points that indicate where the intersection lines intersect the contour of the vector graphic, the intersection points creating an array having a row corresponding to each intersection line;

connecting with a connection line the intersection points of each row, and verifying that each of the connection lines are contained within the contour of the vector graphic, and removing portions of any connection lines not contained within the contour of the vector graphic, wherein the angle of rotation is determined by a hatch angle control variable.

14. An apparatus for hatch filling a vector shape, comprising:

a processor;

an operating system memory storing an operating system program, the operating system memory being coupled to the processor;

a vector shape database memory for storing data that defines a vector shape, the vector shape database memory being coupled to the processor;

a display routines memory for storing a display program, the display routine memory being coupled to the processor;

an intersection lines memory for storing data that defines intersection lines, the intersection lines memory being coupled to the processor;

an intersection points memory for storing data that defines intersection lines, the intersection points memory coupled to the processor;

a connection lines and dashed lines memory for storing data that define connection lines and dashed lines, the connection lines and dashed lines memory being coupled to the processor;

a hatch fill routines memory for storing routines necessary for generating hatch fills, the hatch fill routines memory being coupled to the processor; and a hatch fill control variables memory for storing data necessary for generating hatch fills, the hatch fill control variables memory being coupled to the processor.

15. The apparatus as recited in claim 14, the hatch fill control variables memory further comprising:

a hatch frequency memory allocation for storing a variable that determines a width between intersection lines;

a hatch angle memory allocation for storing a variable that determines an angle for rotating the vector shape; and a dashing characteristics memory allocation for storing a variable that determines length of dashes and spaces between dashes in dashed lines.

16. The apparatus as recited in claim 15, the hatch fill control variables memory further comprising:

a repetition applications memory allocation for storing a variable that determines the number of times a hatch fill generation sequence is applied to the vector shape.

17. The apparatus as recited in claim 16, the hatch fill control variables memory further comprising:

a hatch frequency variance memory allocation for storing a variable that determines an amount the width between intersection lines may vary;

a hatch angle variance memory allocation for storing a variable that determines the amount the angle of rotation may vary between different rotations of the vector shape;

a dashing characteristics variance memory allocation for storing a variable that determines the amount the length of dashes and spaces in the dashed lines may vary; and a repetition applications variance memory allocation for storing a variable that determines the amount the number of hatch fill generation routines may vary.

18. An apparatus for hatch filling a vector graphic, comprising:

means for reading vector graphic data defining a contour of a vector graphic;

means for creating a series of intersection lines overlaying the vector graphic;

means for defining intersection points that indicate where the intersection lines intersect the contour of the vector graphic, and wherein the intersection points create an array having a row corresponding to each intersection line;

means for connecting with a connection line the intersection points of each row; and means for verifying that each of the connection lines are contained within the contour of the vector graphic, and removing portions of any connection lines not contained within the contour of the vector graphic.

19. A computer usable medium having computer readable program code means embodied therein for causing a computer to perform the steps of:

reading vector graphic data defining a contour of a vector graphic;

creating a series of intersection lines overlaying the vector graphic;

defining intersection points that indicate where the intersection lines intersect the contour of the vector graphic, and wherein the intersection points create an array having a row corresponding to each intersection line;

connecting with a connection line the intersection points of each row; and verifying that each of the connection lines are contained within the contour of the vector graphic, and removing portions of any connection lines not contained within the contour of the vector graphic.

20. The computer usable medium of claim 19, the computer readable program code means further causing in a computer the step, prior to the step of creating the series of intersection lines overlaying the vector graphic, of:

rotating the contour of the vector graphic.

21. The computer usable medium of claim 20, the computer readable program code means further causing in a computer the step of:

rotating the contour of the vector graphic back to its original position.

22. The computer usable medium of claim 20, further causing in a computer the step of:

rotating the connection lines together with the contour of the vector shape.

23. The computer usable medium of claim 20, further causing in a computer the step of:

dashing each of the connection lines between the intersection points.

* * * * *